(12) United States Patent
Andoh et al.

(10) Patent No.: US 7,814,935 B2
(45) Date of Patent: Oct. 19, 2010

(54) VORTEX VALVE

(75) Inventors: Robert Y. G. Andoh, Mitcham (GB); Jeremy P. Le-Cornu, Shepton Mallet (GB); Michael G. Faram, Portishead (GB)

(73) Assignee: Hydro International PLC (GB)

( * ) Notice: Subject to any disclaimer, the term of this patent is extended or adjusted under 35 U.S.C. 154(b) by 385 days.

(21) Appl. No.: 11/782,842

(22) Filed: Jul. 25, 2007

(65) Prior Publication Data

US 2008/0017819 A1    Jan. 24, 2008

Related U.S. Application Data

(62) Division of application No. 10/505,946, filed as application No. PCT/GB03/00565 on Feb. 7, 2003, now abandoned.

(30) Foreign Application Priority Data

Feb. 27, 2002   (GB) ................... 0204644.9

(51) Int. Cl.
*F16C 1/16* (2006.01)
(52) U.S. Cl. ...................... 137/813; 251/126
(58) Field of Classification Search ............... 137/808, 137/812, 813; 251/126
See application file for complete search history.

(56) References Cited

U.S. PATENT DOCUMENTS 2,296,314 A * 9/1942 Slade .................. 454/262
3,215,165 A   11/1965 Boadway
3,516,551 A * 6/1970 Wallen et al. ............ 210/512.1
4,369,047 A    1/1983 Arscott et al.
4,613,172 A    9/1986 Schattmaier
5,080,137 A * 1/1992 Adams .................. 137/810
5,303,782 A * 4/1994 Johannessen ............ 137/809
5,651,466 A * 7/1997 Satomi .................. 209/734

FOREIGN PATENT DOCUMENTS

| DE | 39 17 643 | 12/1990 |
|----|-----------|---------|
| DE | 196 03 299 | 7/1997 |
| GB | 2 116 457 | 9/1983 |
| WO | WO 9204667 A1 * | 3/1992 |

* cited by examiner

*Primary Examiner*—John Rivell
*Assistant Examiner*—Andrew J Rost
(74) *Attorney, Agent, or Firm*—Stites & Harbison PLLC; Marvin Petry; Douglas E. Jackson

(57) ABSTRACT

A coupling is provided preferably for a vortex valve for use on an outlet pipe in a sewerage system. The coupling comprises an outer component for insertion into a bore of a pipe, and an inner component which is inserted into the outer component, ramp means being provided between the two components, whereby the outer component is expanded to seal against the bore when the inner component is inserted into the outer component so as to engage the second ramp portion. The ramp means comprise first and second portions of different inclinations. The vortex valve has a circumferential inlet which is adjustable.

4 Claims, 3 Drawing Sheets

VORTEX VALVE

CROSS REFERENCE TO RELATED APPLICATIONS

This application is a divisional of application Ser. No. 10/505,946 filed Apr. 14, 2005, now abandoned, which is the National Stage of International Application No. PCT/GB03/00565, filed Feb. 7, 2003 (which is hereby incorporated by reference).

BACKGROUND OF THE INVENTION AND PRIOR ART

This invention relates to a vortex valve having a variable inlet.

A vortex valve is disclosed in WO-A-99/43899. Such valves are used, for example in sewerage systems, for controlling fluid flow by a hydraulic effect without requiring moving parts. Such devices have a vortex chamber provided with an outlet at one axial end and an inlet arranged to cause swirl in the chamber when a certain critical flow has been attained. WO-A-99/43899 discloses a vortex valve in which the vortex chamber is defined by a circular cylindrical wall and two axial end walls.

At low flow rates, water entering through the inlet of a vortex valve passes through the vortex chamber to the outlet with substantially no pressure drop, and the valve can be considered to be open. At high flow rates, water enters through the inlet with enough energy to create a vortex in the vortex chamber which results in a significant pressure drop between the inlet and the outlet, which may greatly restrict flow through the outlet, or even substantially cut it off altogether. Thus the valve serves to limit the rate of flow automatically. Vortex valves can be used, for example, to control the flow of stormwater in sewers, to ensure that equipment downstream of the valve is not overloaded during periods of heavy rainfall.

Vortex valves are commonly installed in a collection chamber in which rain water, drained from road surfaces and other paved areas, collects. An outlet pipe extends from a wall of the collection chamber to a sewer, and the vortex valve is mounted so that its outlet makes a water-tight connection with the end of the outlet pipe. WO-A-99/43899 discloses mounting means for this purpose which comprises a first element fitted to the end wall of the vortex valve about its outlet opening, and a second element which is fitted to the outlet pipe. The vortex valve can then be fitted to the outlet pipe by connecting the two elements together.

The mounting means disclosed in WO-A-99/43899 requires the fitting of the second element to the outlet pipe. This is not always easy to achieve in a manner which will provide a water-tight connection between the vortex valve and the outlet pipe and is, in any case, a time consuming operation requiring fasteners and power tools.

SUMMARY OF THE INVENTION

According to one aspect of the present invention, there is provided a coupling for engagement with a bore, the coupling comprising an outer component having an expandable ring having a central axis, and an inner component which is longitudinally displaceable within the ring, ramp means being provided between the inner component and the ring whereby longitudinal displacement of the inner component within the ring causes radial expansion of the ring to engage the bore, the ramp means comprising a ramp surface on one of the components and a circumferential projection on the other component, the ramp surface having first and second portions of differing inclination to the central axis, whereby the circumferential projection engages the ramp surface portions successively as the inner component is displaced longitudinally relative in the ring.

In a preferred embodiment, a coupling in accordance with the present invention is used to mount a vortex valve on an outlet pipe which defines the bore. The inner component is preferably fixed to an end wall of the vortex valve, and may be integral with the housing of the vortex valve. Thus, the inner component may comprise a spigot projecting axially from the vortex valve and surrounding the outlet of the vortex valve.

The ramp surface is preferably provided on the inner component, and the circumferential projection is provided on the ring of the outer component, for engagement with the ramp surface.

In a preferred embodiment, the first portion of the ramp surface is inclined by a smaller angle than the second portion to the direction of longitudinal displacement, and is situated ahead of the second portion with respect to the direction of longitudinal displacement of the inner component corresponding to expansion of the ring.

The coupling may include rotational ramp means between the inner and outer components whereby rotation of the inner component relatively to the outer component longitudinally displaces the two components in relation to each other. Preferably, the rotational ramp means remains disengaged as the first portion of the ramp surface is operative, whereby the circumferential projection engages the first portion of the ramp surface during longitudinal displacement of the components relatively to each other, without requiring rotation. When the circumferential projection contacts the second portion of the ramp surface, the rotational ramp means is engaged, and subsequently rotation of the components relatively to each other longitudinally displaces the two components in relation to each other, causing the circumferential projection to move over the second portion of the ramp surface.

The rotational ramp means may comprise at least one peg on one of the components which engages a helical groove in the other component.

A seal may be provided on the outer surface of the ring to provide sealing between the coupling and the bore.

The ring may be provided with at least one longitudinal slot, preferably extending from a free axial end of the ring, to provide for radial expansion of the ring. A plurality of the slots may be provided to divide the ring circumferentially into a plurality of resilient fingers. The circumferential projection may then be made up of a plurality of segments at the free ends of the fingers.

In a preferred embodiment, the first portion of the ramp surface may be inclined to the longitudinal direction by an angle of 2° to 10°, for example 5°, and the second portion of the ramp surface may be inclined to the longitudinal direction by an angle of 30° to 50°, for example 40°.

According to a second aspect of the present invention, there is provided a method of installing a vortex valve on a pipe by means of a coupling as defined above, the method comprising the steps of:

fitting the ring of the outer component within the bore of the pipe, longitudinally displacing the inner component into the ring, such that the first portion of the ramp means provides a first expansion of the ring and subsequently the second portion of the ramp means provides a second expansion of the ring into sealing engagement with the bore.

Preferably, in a method of installing a vortex valve provided with rotational ramp means, the inner component is displaced longitudinally into the outer component to engage the rotational ramp means, and subsequently rotation of the vortex valve causes operation of the rotational ramp means to displace the inner component longitudinally to cause the second expansion of the ring.

According to a third aspect of the present invention, there is provided a vortex valve comprising a vortex chamber having a circular cylindrical outer wall and a tangential inlet passage, the inlet passage opening into the vortex chamber at a circumferential aperture which is adjustable by means of a sliding plate which is movable across the circumferential inlet. The sliding plate may be arcuate so that it lies over the outer wall of the vortex valve and is slidable about the axis of the outer wall. Means may be provided for retaining the sliding plate in an adjusted position.

Preferably, the inlet passage of the vortex valve is defined by a tangential extension of the cylindrical outer wall of the vortex valve, and by extensions of the axial end walls of the vortex valve, whereby the inlet passage is of rectangular form.

BRIEF DESCRIPTION OF THE DRAWINGS

For a better understanding of the present invention and to show more clearly how it may be carried into effect, reference will now be made, by way of example, to the accompanying drawings, in which.

DETAILED DESCRIPTION OF PREFERRED EMBODIMENTS

Figure 1:
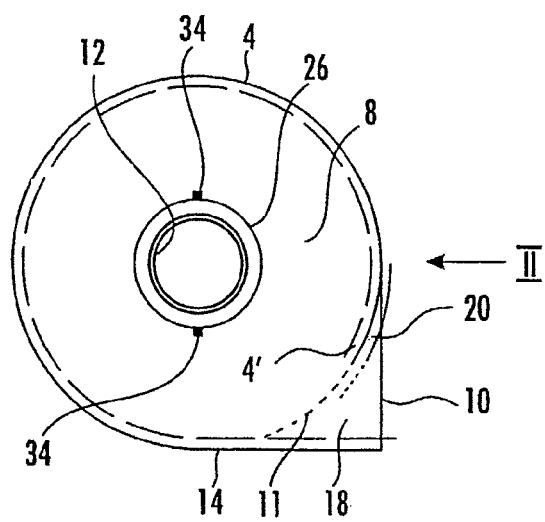
FIG. 1 is an end view of a vortex valve.
Figure 2:
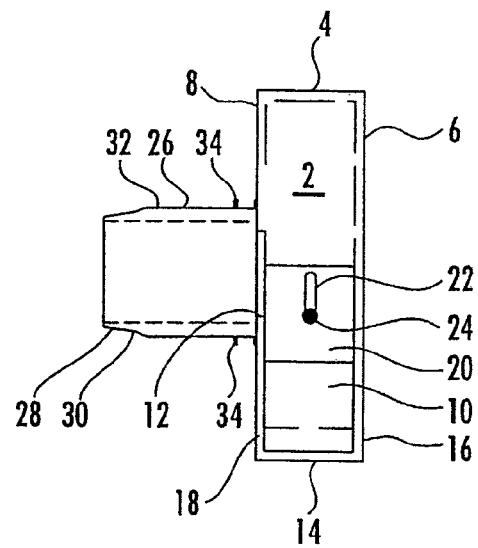
FIG. 2 is a side view taken in the direction of the arrow II in FIG. 1.

The vortex valve shown in FIGS. 1 and 2 comprises a vortex chamber 2 defined by a circumferential outer wall 4 and axial end walls 6, 8. The vortex valve has an inlet passage 10 and an outlet 12. The inlet passage 10 is rectangular, as seen in FIG. 2, and is defined by a tangential extension 14 of the outer wall 4, and by lateral extensions 16, 18 of the axial end walls 6, 8. The inlet passage 10 communicates with the vortex chamber 2 via a circumferential inlet 11. In the orientation shown in FIG. 1, the edges of the lateral extensions 16, 18 extend vertically, and they are tangential to the outer wall 4. The outer wall 4 itself extends beyond its junction with the lateral extensions 16, 18, as shown by the part 4'.

An adjustment plate 20, which is rectangular as shown in FIG. 2 but arcuate as shown in FIG. 1, lies over the outer wall 4 and is slidable between the lateral extensions 16, 18 over an arcuate path (see FIG. 8) to reduce the area of the circumferential inlet 11. The plate 20 has a slot 22 which allows the plate to slide relatively to a fixing bolt 24 which can be tightened to retain the plate 20 in an adjusted position.

The outlet 12 is disposed centrally in the axial end wall 8. A spigot 26 is fixed to the end wall 8 and projects axially from it. The spigot 26 has an outer surface which, extending from its free end, has three portions, namely a first ramp surface 28, a second ramp surface 30 and a cylindrical surface 32. A pair of diametrically oppositely disposed pegs 34 project from the cylindrical surface 32 close to the end wall 8.

The first ramp surface 28 is inclined to the axis of the spigot 26 by a smaller angle than the second ramp surface 30. In the embodiment shown in the drawings, the angle of inclination of the first ramp surface 28 is 5°, and that of the second ramp surface 40°.

The vortex valve of FIGS. 1 and 2 may be made of any suitable material, for example steel or plastics material. In the preferred embodiment, it is made from a plastics material, and the spigot 26 is formed integrally with, or welded or otherwise bonded to, the end wall 8.

Alternatively, the spigot 26 may be removably attached to the wall 8 to allow for replacement of the spigot 26 or to allow use of the vortex valve with spigots of different diameter, in order to change the characteristics of the vortex valve.

Figure 3:
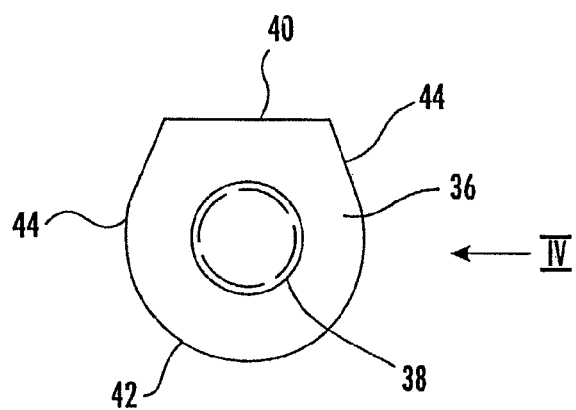
FIG. 3 is an end view of a coupling member for use with the vortex valve of FIGS. 1 and 2.
Figure 4:
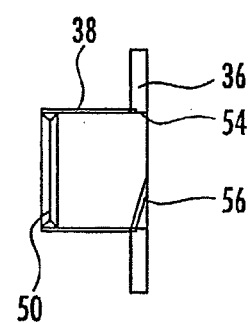
FIG. 4 is a side view taken in the direction of the arrow IV in FIG. 3.

The coupling shown in FIGS. 3 and 4 may also be made from plastics material and formed as an integral component. It comprises a flange 36 from which projects an expandable ring 38. The flange 36 is non-circular, and includes a straight edge 40 (shown as the upper edge in FIG. 3), which is connected to an arcuate edge portion 42 by two lateral straight edges 44.

Figure 5:
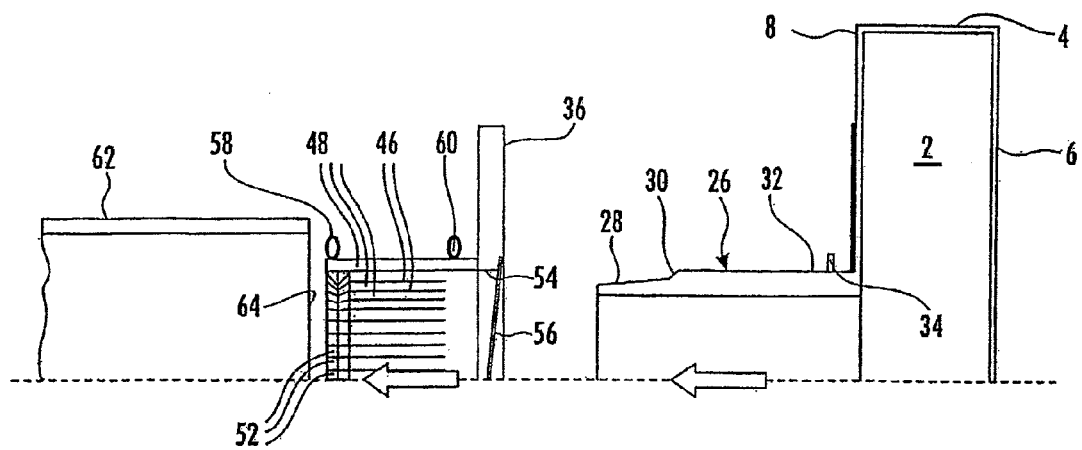
FIG. 5 shows a first stage in the fitting of the vortex valve of FIGS. 1 and 2 to a pipe by means of the coupling member of FIGS. 3 and 4.

As best seen in FIG. 5, a circumferential series of axially extending slots 46 extend from the end of the ring 38 away from the flange 36, stopping short of the flange 36. These slots 46 divide the free end region of the ring 38 into separate resilient fingers 48. At the free end of the ring 38 there is an inwardly extending circumferential projection 50 which is divided by the slots 46 into separate segments 52 at the ends of the respective fingers 48.

The flange 36 has a central aperture 54 which coincides with the inner surface of the ring 38. The internal surface of the flange 36 around the aperture 54 is provided with a pair of helical grooves 56 which are offset from each other by 180° around the axis of the flange 36.

As shown in FIG. 5, sealing rings 58 and 60 are fitted over the ring 38.

FIG. 5 shows an outlet pipe 62 which terminates at an end 64 in a stormwater collecting chamber. The vortex valve of FIGS. 1 and 2 is fitted to the outlet pipe 62 as will now be described with reference to FIGS. 5 and 7.

Figure 6:
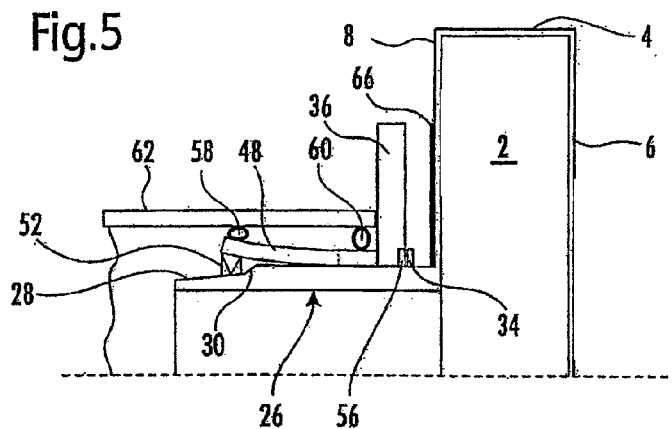
FIG. 6 shows a second stage during the fitting of the vortex valve.
Figure 7:
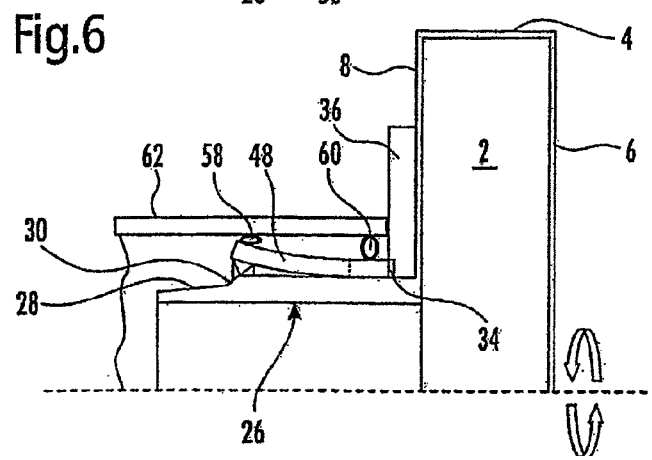
FIG. 7 shows a final stage in the fitting of the vortex valve.

Initially, the ring 38 of the coupling member of FIGS. 3 and 4 is inserted into the outlet pipe 62 until the flange 36 abuts the end 64 of the pipe 62. Subsequently, the spigot 26 of the vortex valve is inserted into the coupling member. When the first ramp surface 28 engages the projection 50 made up of the segments 52, the inclination of the ramp surface will cause the fingers 48 to be pushed radially outwardly as insertion of the spigot 26 continues. Since the slope of the first ramp portion 28 is of a relatively small angle of inclination, it is relatively easy to push the vortex valve manually towards the pipe 62 against the resistance provided by the resilient action of the fingers 48. However, when the second ramp surface 30 reaches the projection segments 52, shortly after the position shown in FIG. 6, the resistance to further longitudinal movement increases owing to the increased angle of inclination of the second ramp surface 30. At this position, provided the rotational position of the vortex valve with respect to the coupling member is correct, the pegs 34 will be aligned with the helical grooves 56 where they emerge at the right-hand end face of the flange 36 (as viewed in FIGS. 5 to 7). The pegs 34 can thus enter the helical grooves 56, whereupon rotation of the vortex valve relative to the coupling member will cause a rotational camming effect which draws the spigot 26 further into the ring 38, causing the projection segments 52 to ride over the second ramp surface 30, forcing the ends of the fingers 48 further apart to compress the seal 58 firmly against the inner bore of the pipe 62 (as shown in FIG. 7).

It will be appreciated that the engagement between the pegs 34 and the helical grooves 56 lock the vortex valve securely to the coupling member. Thus, the vortex valve is firmly secured to the outlet pipe 62 in a sealing-tight manner without requiring any special tools or fasteners. Furthermore, no specialised preparation of the pipe end 62 is required, and there is no need for the pipe 62 to project freely into the stormwater collecting chamber. For additional sealing purposes, a sealing ring 66 is provided to prevent leakage between the end wall 8 of the vortex valve and the flange 36 of the coupling member.

The non-circular shape of the flange 36 assists in the proper positioning of the coupling member so that the pegs 34 can be engaged with the helical grooves 56. Also, proper positioning of the coupling member when inserted into the pipe 62 (for example with the flat edge 40 uppermost and horizontal) will ensure that, in the final position of the vortex valve, the vortex valve itself is properly positioned in the collecting chamber, with the inlet passage 10 at the bottom.

Figure 8:
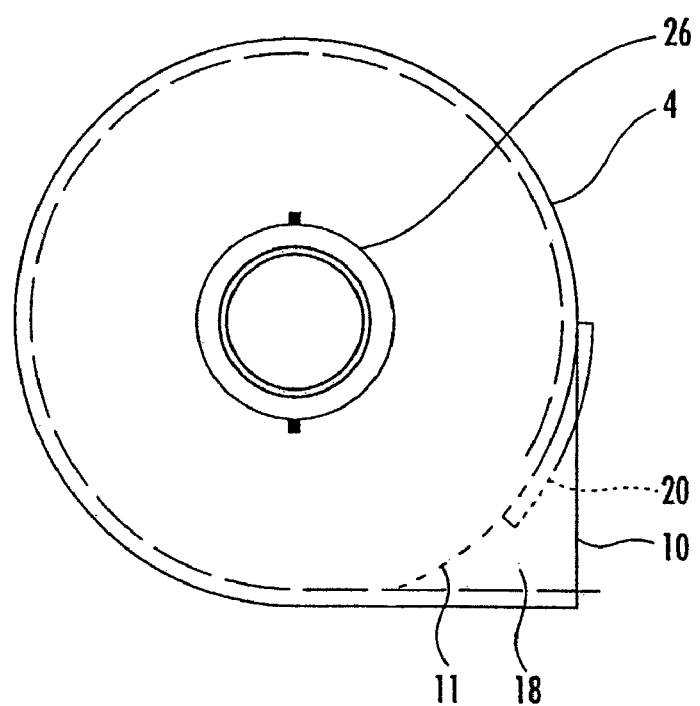
FIG. 8 is an enlarged view corresponding to FIG. 1 showing adjustment of an inlet of the vortex valve.

As shown in FIG. 8, the plate 20 can be displaced arcuately over the outer wall 4, as shown in dashed outline, in order to reduce the area of the circumferential inlet 11. A reduction in this area alters the characteristics of the vortex valve, and in particular alters the pressure head at the inlet at which a vortex will be initiated within the vortex chamber 2 to cause a braking action, and also varies the relationship between the pressure head and flow rate through the vortex valve once the vortex is established. Adjustment of the area of the circumferential inlet 11 may be made in conjunction with selection of a spigot 26 of appropriate diameter to provide the desired flow characteristics.

It has been found that adjustment of the inlet area in this manner, in conjunction with a vortex chamber having a circular cylindrical outer wall surprisingly enhances the versatility of the vortex valve. This is because, by appropriate adjustment of the inlet area, the characteristics of the vortex valve can be varied to suit a significant range of required flow characteristics. This in turn means that the same size of vortex valve can be used in different circumstances, with only the inlet area being adjusted by means of the plate 20 (possibly in conjunction with selection of an appropriate spigot diameter) in order to suit the vortex valve to the particular circumstances of its installation. This leads to manufacturing efficiencies, since vortex valves no longer need to be designed specifically for each installation. Instead, a relatively small range of vortex valves of different dimensions is required, with each vortex valve being fine-tuned by way of the adjustment plate 20 to suit individual circumstances. For example, it is believed that a range of only four vortex valves of different dimensions is required to fulfill most needs of the market.

An important aspect of the adjustment means of FIG. 8 is that the adjustment plate 20 extends generally along an arc which is substantially coincident with the circle on which lies the cylindrical outer wall 4. The plate 20, when moved across the inlet to reduce the inlet area, thus contributes to the swirling movement within the chamber 2 when a vortex is established.

We claim:

1. A vortex valve for controlling fluid flow by a hydraulic effect automatically comprising:
    a circular cylindrical outer wall defining a vortex chamber,
    an axial end,
    a tangential inlet passage opening into the vortex chamber at a circumferential aperture in the outer wall through which a fluid flow enters the vortex chamber,
    adjustment means for adjusting the circumferential aperture, the adjustment means comprising an arcuate sliding plate which is displaceable over the external surface of the outer wall, and
    a single outlet opening disposed in the axial end of the vortex chamber through which all of the fluid flow exits the vortex chamber.

2. A vortex valve as claimed in claim 1, further including a retaining means for retaining the sliding plate in an adjusted position.

3. A vortex valve as claimed in claim 2, wherein the retaining means comprises a fixing bolt.

4. A vortex valve as claimed in claim 1, wherein the inlet passage of the vortex valve is defined by a tangential extension of the cylindrical outer wall of the vortex chamber and by extensions of the axial ends of the vortex chamber whereby the inlet passage is of rectangular form.

* * * * *